(12) United States Patent
Yeo et al.

(10) Patent No.: US 8,531,628 B2
(45) Date of Patent: Sep. 10, 2013

(54) DISPLAY DEVICE HAVING IMPROVED CONTRAST RATIO

(75) Inventors: Yong-Seok Yeo, Yongin (KR); Jae-Hyun Kim, Yongin (KR); Jae-Ik Lim, Yongin (KR); Gee-Bum Kim, Yongin (KR); Jong-in Baek, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 238 days.

(21) Appl. No.: 13/041,096

(22) Filed: Mar. 4, 2011

(65) Prior Publication Data

US 2012/0113374 A1  May 10, 2012

(30) Foreign Application Priority Data

Nov. 8, 2010 (KR) .......................... 10-2010-0110569

(51) Int. Cl.
 *G02F 1/1333* (2006.01)
(52) U.S. Cl.
 USPC ............................................................ 349/86
(58) Field of Classification Search
 USPC ..................................................... 349/86, 89
 See application file for complete search history.

(56) References Cited

U.S. PATENT DOCUMENTS 5,386,306 A * 1/1995 Gunjima et al. ................ 349/89

FOREIGN PATENT DOCUMENTS

| JP | 05241130 | 9/1993 |
| JP | 05249443 | 9/1993 |
| JP | 07128645 | 5/1995 |
| JP | 08152607 | 6/1996 |
| JP | 09329787 | 12/1997 |
| JP | 11160682 | 6/1999 |
| JP | 11174436 | 7/1999 |
| KR | 1020050094011 A | 9/2005 |

* cited by examiner

*Primary Examiner* — James Dudek
(74) *Attorney, Agent, or Firm* — Robert E. Bushnell, Esq.

(57) ABSTRACT

A display device comprises: a first substrate; a second substrate opposite the first substrate; an electrode unit formed on one or both of the first substrate and the second substrate, and configured to form an electric field between the first substrate and the second substrate; and a polymer dispersed liquid crystal layer located so as to correspond to the electric field formed between the first substrate and the second substrate, and having a reflector configured to reflect light.

20 Claims, 5 Drawing Sheets

DISPLAY DEVICE HAVING IMPROVED CONTRAST RATIO

CLAIM OF PRIORITY

This application makes reference to, incorporates the same herein, and claims all benefits accruing under 35 U.S.C. §119 from an application earlier filed in the Korean Intellectual Property Office on Nov. 8, 2010 and there duly assigned Serial No. 10-2010-0110569.

BACKGROUND OF THE INVENTION

1. Field of the Invention

The present invention relates generally to a display device, and more particularly, to a display devices including a polymer dispersed liquid crystal layer.

2. Description of the Related Art

A display device is a device for displaying images. Recently, as the interest in display device has increased, various technologies have appeared for the purpose of improving the performance of the display device.

Among various types of display devices, a liquid crystal display (LCD) has been successful in markets for display devices so that manufacturers manufacturing such a liquid crystal device have suggested a number of technologies competitively in order to improve the performance of their liquid crystal displays.

Under such competition, improvement in the ratio of black to white of a liquid crystal display (LCD) (that is, a contrast ratio) has been of interest in connection with the performance of the liquid crystal display.

The above information disclosed in this Background section is only for enhancement of an understanding of the background of the described technology, and therefore it may contain information which does not form the prior art which is already known in this country to a person of ordinary skill in the art.

SUMMARY OF THE INVENTION

The present invention has been developed in an effort to provide a display device having the advantage of an improved contrast ratio.

An exemplary embodiment provides a display device comprising: a first substrate; a second substrate opposite the first substrate; an electrode unit formed on one or both of the first substrate and the second substrate, and configured to form an to electric field between the first substrate and the second substrate; and a polymer dispersed liquid crystal layer located so as to correspond to the electric field formed between the first substrate and the second substrate, and having a reflector configured to reflect light.

The reflector may include white dye.

The display device may further include a color layer adjacent to the first substrate, and configured to represent one or more colors.

The display device may further include one or more barrier ribs located between the first substrate and the second substrate, and configured to partition a space between the first substrate and the second substrate into a plurality of spaces.

The color layer may include a plurality of sub color layers corresponding to the respective spaces between the first substrate and the second substrate resulting from the partition by the barrier ribs, and the neighboring sub color layers of the plurality of sub color layers may represent different colors.

The electrode unit may include a first electrode located on the first substrate and a second electrode located on the second substrate opposite the first electrode.

At least one of the first electrode and the second electrode may include a transparent conductive material.

The first electrode may represent one or more colors.

The first electrode may include a plurality of sub electrodes corresponding to the respective spaces between the first substrate and the second substrate resulting from the partition by the barrier ribs, and the neighboring sub electrodes of the plurality of sub electrodes may represent different colors.

The electrode unit may include a third electrode located on the first substrate and a fourth electrode adjacent to the third electrode and located on the first substrate.

The polymer dispersed liquid crystal layer may include one or both of a polymer dispersed liquid crystal (PDLC) and a polymer network liquid crystal (PNLC).

At least one of the first electrode and the second electrode may include a transparent substrate.

According to exemplary embodiments, a display device having improved contrast ratio, and thus improved display quality, is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

The drawings and description are to be regarded as illustrative in nature and not restrictive. Like reference numerals designate like elements throughout the specification.

In addition, a configuration having the same components denoted by the same reference numerals will representatively be in a first exemplary embodiment of various exemplary embodiments, and other components different from the first exemplary embodiment will be described in other exemplary embodiments.

In addition, the size and thickness of each component shown in the drawings are arbitrarily shown for understanding and ease of description, but the present invention is not limited thereto.

In the drawings, the thickness of layers, films, panels, regions, etc. are exaggerated for clarity. It will be understood that, when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Furthermore, the term "on" will be understood to indicate that an element is positioned on another element either directly or with intervening elements.

Hereinafter, a display device according to a first exemplary embodiment will be described in detail with reference to FIGS. 1 thru 3.

Figure 1:
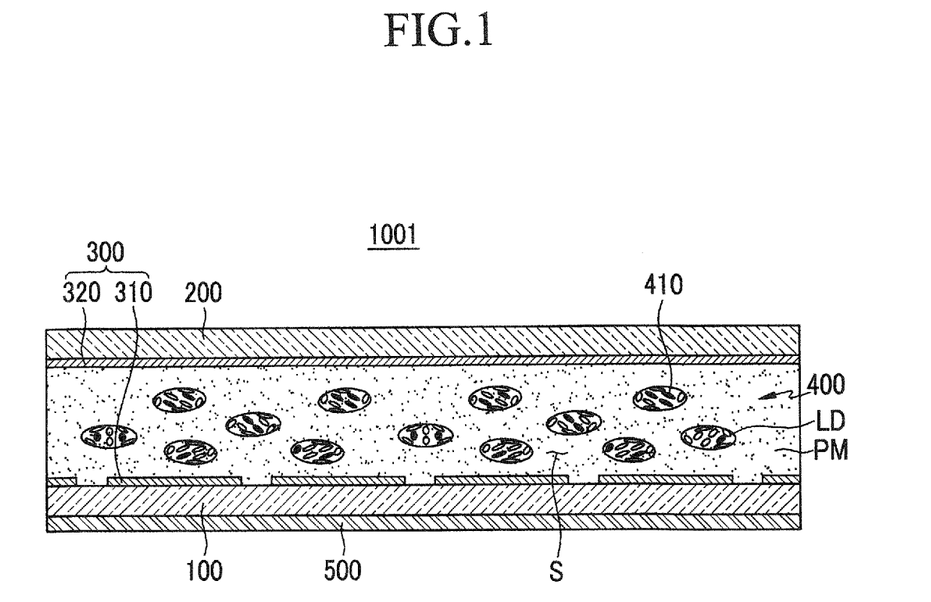
FIG. 1 is a cross-sectional view showing a display device according to a first exemplary embodiment of the invention.

FIG. 1 is a cross-sectional view showing a display device according to a first exemplary embodiment of the invention.

As shown in FIG. 1, the display device 1001 according to the first exemplary embodiment includes a first substrate 100, a second substrate 200, an electrode unit 300, a polymer dispersed liquid crystal layer 400, and a color layer 500.

The first substrate 100 may comprise a transparent substrate including one or more of transparent glass and polymer, a thin film transistor (TFT) formed on the transparent substrate, or the like.

The second substrate 200 is opposite the first substrate 100, and a space S is located between the second substrate 200 and the first substrate 100. The second substrate 200 may comprise a transparent substrate including one or more of transparent glass and polymer, a black matrix (BM) formed on the transparent substrate so as to correspond to a thin film transistor (TFT) formed on the first substrate 100, or the like. The electrode unit 300 is located in the space S formed between the second substrate 200 and the first substrate 100.

The electrode unit 300 generates an electric field in the space S formed between the second substrate 200 and the first substrate 100, and includes first electrodes 310 and a second electrode 320.

The first electrodes 310 are located on the first substrate 100 and include a transparent conductive material, such as indium tin oxide (ITO) or indium zinc oxide (IZO). The first electrodes 310 are patterned so as to correspond to respective pixels, one of which is the smallest unit of an image displayed by the display device 1001. The second electrode 320 is located above the first electrode 310 so as to be spaced apart therefrom by the space S formed between the second substrate 200 and the first substrate 100.

The second electrode 320 is located on the second substrate 200 opposite the first electrode 310, and forms an electric field in the space S in conjunction with the first electrode 310. The second electrode 320 is disposed in the form of a plate throughout the second substrate 200. The second electrode 320 includes a transparent conductive material, such as indium tin oxide (ITO) or indium zinc oxide (IZO).

The polymer dispersed liquid crystal layer 400 is located within the space S formed between the first substrate 100 and the second substrate 200, and is located so as to correspond to the electric field formed in the space S by the first electrode 310 and the second electrode 320. The polymer dispersed liquid crystal layer 400 includes one or more of polymer dispersed liquid crystal (PDLC) and polymer network liquid crystal (PNLC). The polymer dispersed liquid crystal layer 400 has a form in which liquid crystal droplets (LDs), each including liquid crystals disorderly arranged, are disorderly arranged within a polymer matrix (PM). As described above, the polymer dispersed liquid crystal layer 400 has liquid crystal droplets (LDs) disorderly arranged within the polymer matrix (PM) so that, when the electric field is not formed in the space S, light irradiated toward the polymer dispersed liquid crystal layer 400 from the outside is scattered within the polymer dispersed liquid crystal layer 400 due to the difference between the refractive indices of the polymer matrix (PM) and the liquid crystal droplets (LDs).

Meanwhile, when a voltage is applied to the electrode unit 300, and then the electric field is formed in the space S between the first electrode 100 and the second electrode 200, the liquid crystal droplets (LDs) disorderly arranged within the polymer matrix (PM) are arranged in a line due to the electric field. Due to this, light irradiated toward the polymer dispersed liquid crystal layer 400 from the outside penetrates through the polymer dispersed liquid crystal layer 400 so as to be irradiated in the direction of the color layer 500, as described below.

Furthermore, the polymer dispersed liquid crystal layer 400 includes reflectors 410.

The reflectors 410 may be located so as to be adjacent to the liquid crystal within the liquid crystal droplet (LD) or so as to be adjacent to the liquid crystal droplet (LD) within the polymer matrix (PM), and functions to reflect light. Particularly, the reflector 410 has white dye. Since white has a characteristic of reflecting light having wavelengths of visible light region more than red, green, blue and black light, when the reflector 410 has white dye, light irradiated toward the polymer dispersed liquid crystal layer 400 from the outside is scattered within the polymer dispersed liquid crystal layer 400 and, at the same time, is reflected by the reflector 410. Therefore, the light is more scattered within the polymer dispersed liquid crystal layer 400.

The color layer 500 is adjacent to the first substrate 100, and is located under the first substrate 100 between the first substrate 100 and the external space. The color layer 500 represents one or more of red, green, blue and white. When the electric field is formed in the space S between the first substrate 100 and the second substrate 200, light penetrating through the polymer dispersed liquid crystal layer 400 from the outside is reflected by the color layer 500, so that the color reflected and represented by the color layer 500 is visible from the outside.

Hereinafter, the operation of the display device 1001 according to the first exemplary embodiment will be described below with reference to FIGS. 2 and 3.

Figure 2:
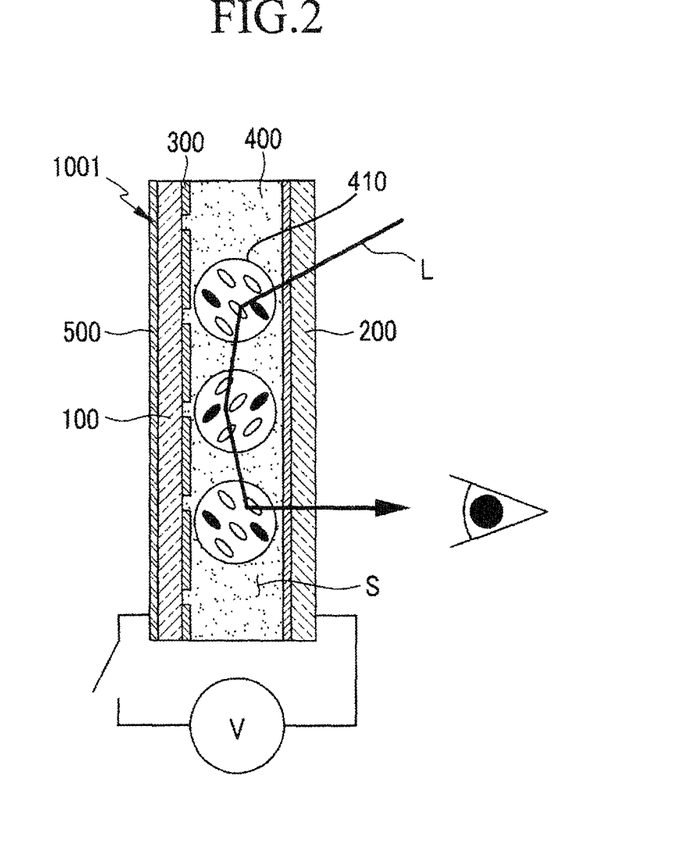
FIGS. 2 and 3 are drawings for explaining the operation of the display device according to the first exemplary embodiment of the invention.
Figure 3:
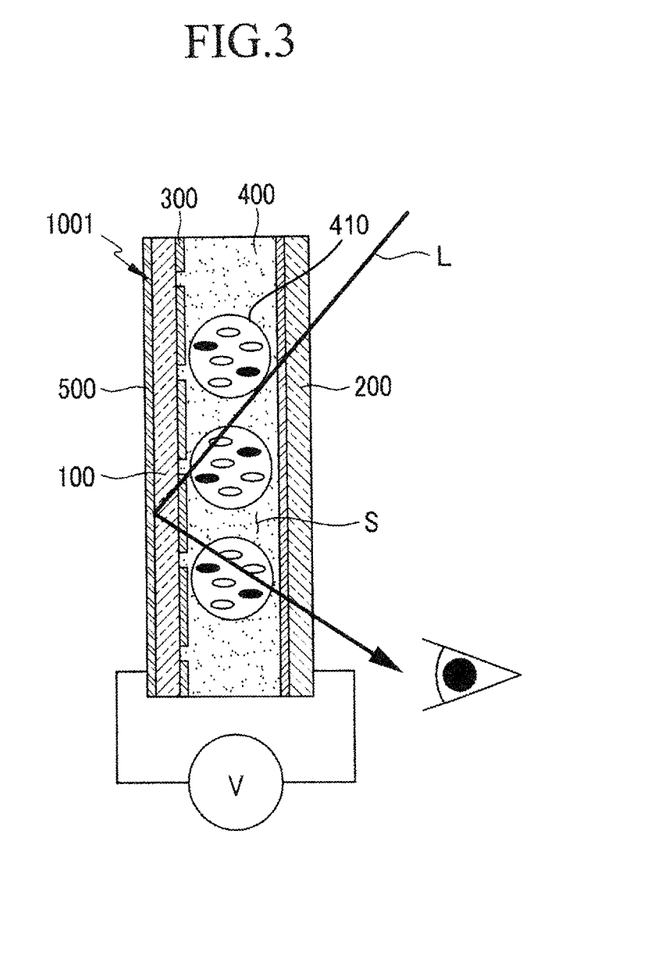

FIGS. 2 and 3 are drawings for explaining the operation of the display device according to the first exemplary embodiment of the invention.

First, as shown in FIG. 2, when a voltage is not applied to the electrode unit 300, light L irradiated from the outside toward the polymer dispersed liquid crystal layer 400 through the second substrate 200 is scattered within the polymer dispersed liquid crystal layer 400. In particular, the light is more scattered by the reflectors 410 so that a user can see an image having black.

Subsequently, as shown in FIG. 3, when a voltage is applied to the electrode unit 300, an electric field is formed in the space S between the first substrate 100 and the second substrate 200 so that the light L irradiated from the outside toward the polymer dispersed liquid crystal layer 400 through the second substrate 200 penetrates through the polymer dispersed liquid crystal layer 400 and subsequently through the first substrate 100, and is then reflected by the color layer 500, thereby making it possible for the users to see an image having the color represented by the color layer 100. Furthermore, the transmittance of the polymer dispersed liquid crystal layer 400 can be adjusted by altering the strength of the electric field formed in the space S so that the color represented by the color layer 500 is adjusted so as to have various color temperatures. Therefore, the user can see the color represented by the color layer 500 as a color having various color temperatures.

As described above, the display device 1001 according to the first exemplary embodiment can display an image having black, and can simultaneously display an image having one or more colors, by applying a voltage to the electrode unit 300 without using an optical member, such as a polarizing plate, thereby reducing manufacturing cost and time.

In addition, since the display device 1001 according to the first exemplary embodiment does not use an optical member, such as a polarizing plate, degradation in display quality, such as outside visibility degraded by the optical member, is minimized.

Furthermore, the display device 1001 according to the first exemplary embodiment displays an image having black when a voltage is not applied to the electrode unit 300, and displays an image having the color represented by the color layer 500 when the voltage is applied to the electrode unit 300, thereby improving its contrast ratio. In particular, since the reflector 410 having white dye is located within the polymer dispersed liquid crystal layer 400, light is more scattered within the polymer dispersed liquid crystal layer 400 so that the degree of black displayed by the display device 1001 is improved. That is, the display device 1001 having an improved contrast ratio due to the reflector 410 is provided.

A display device according to a second exemplary embodiment will be described below with reference to FIG. 4.

Figure 4:
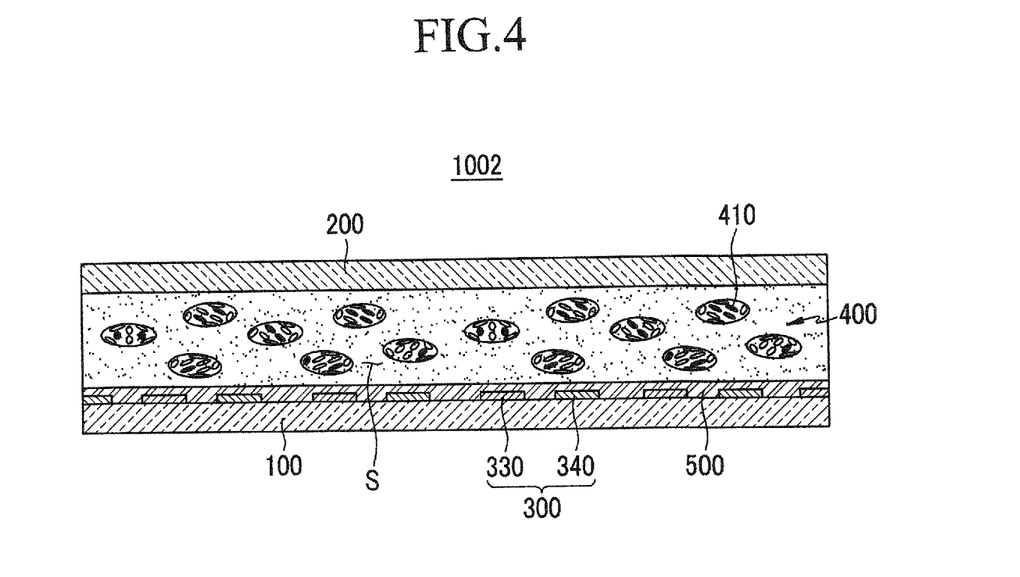
FIG. 4 is a cross-sectional view showing a display device according to a second exemplary embodiment of the invention.

FIG. 4 is a cross-sectional view showing a display device according to a second exemplary embodiment of the invention.

As shown in FIG. 4, the display device 1002 according to the second exemplary embodiment includes a first substrate 100, a second substrate 200, an electrode unit 300, a polymer dispersed liquid crystal layer 400 and a color layer 500.

The first substrate 100 may comprise a transparent substrate including one or more of transparent glass and polymer or an opaque substrate such as metal or ceramic.

The electrode unit 300 includes a third electrode 330 and a fourth electrode 340.

The third electrode 330 is located on the first substrate 100 and includes a transparent conductive material, such as indium tin oxide (ITO) or indium zinc oxide (IZO), or an opaque conductive material, such as aluminum (Al), silver (Ag), gold (Au) or the like. The third electrodes 330 are patterned so as to correspond to respective pixels, one of which is the smallest unit of an image displayed by the display device 1002. The fourth electrode 340 is located adjacent to the third electrode 330.

The fourth electrode 340 is adjacent the third electrode 330, and is located on the first substrate 100. The fourth electrode 340 includes a transparent conductive material, such as indium tin oxide (ITO) or indium zinc oxide (IZO), or an opaque conductive material, such as aluminum (Al), silver (Ag), gold (Au) or the like. The fourth electrodes 340 are patterned so as to correspond to respective pixels.

The color layer 500 is adjacent the first substrate 100, and is located above the first substrate 100 between the first substrate 100 and the second substrate 200. In particular, the color layer 500 is located on the electrode unit 300. Since the color layer 500 is located on the electrode unit 300, light penetrating through the polymer dispersed liquid crystal layer 400 from the outside is directly reflected by the color layer 500 without passing through the electrode unit 300 and the first substrate 100.

As described above, in the display device 1002 according to the second exemplary embodiment, the electrode unit 300 is located on the first substrate 100 so that the fourth electrode 340 is formed simultaneously when the third electrode 330 is formed on the first substrate 100, thereby reducing manufacturing time and cost.

Furthermore, in the display device 1002 according to the second exemplary embodiment, the color layer 500 is located on the electrode unit 300 so that the electrode unit 300 and the first substrate 100 are not necessarily made of a transparent material. Therefore, it is possible to form the electrode unit 300 using an opaque conductive material, such as silver(Ag), gold(Au) or the like, having higher electric conductivity than that of a transparent conductive material, such as indium tin oxide (ITO) or indium zinc oxide (IZO), thereby improving the overall electrical efficiency of the display device 1002.

In addition, in the display device 1002 according to the second exemplary embodiment, the color layer 500 is located on the electrode unit 300 so that it is not necessary to form the first substrate 100 using a transparent material, such as glass or the like.

Hereinafter, a display device according to a third exemplary embodiment will be described below with reference to FIG. 5.

Figure 5:
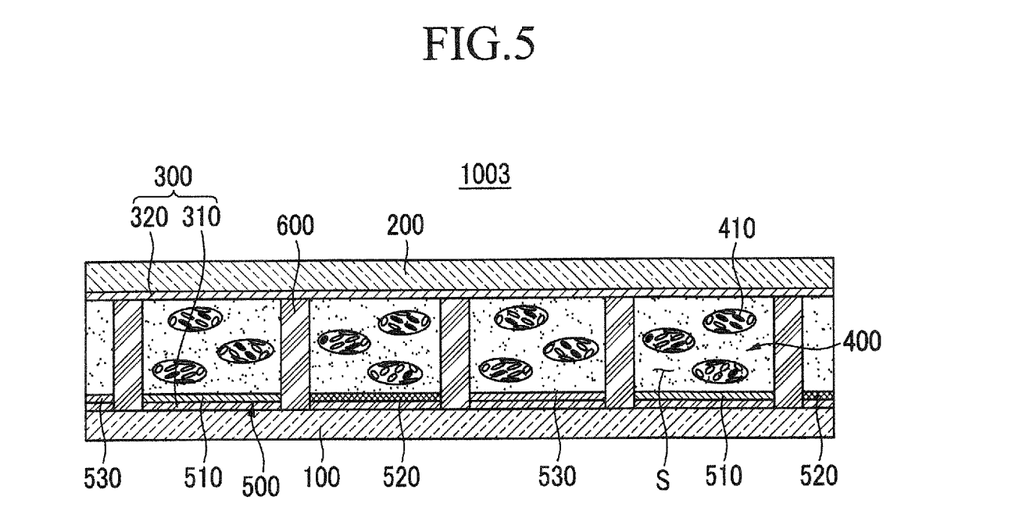
FIG. 5 is a cross-sectional view showing a display device according to a third exemplary embodiment of the invention.

FIG. 5 is a cross-sectional view showing a display device according to a third exemplary embodiment of the invention.

As shown in FIG. 5, the display device 1003 according to the third exemplary embodiment includes a first substrate 100, a second substrate 200, an electrode unit 300, a polymer dispersed liquid crystal layer 400, a color layer 500 and barrier ribs 600.

The electrode unit 300 includes a first electrode 310 and a second electrode 320.

The first electrode 310 is located on the first substrate 100 and includes a transparent conductive material, such as indium tin oxide (ITO) or indium zinc oxide (IZO), or an opaque conductive material, such as aluminum (Al), silver (Ag), gold (Au) or the like.

The color layer 500 is adjacent the first substrate 100, and is located above the first substrate 100 between the first substrate 100 and the second substrate 200. In particular, the color layer 500 is located on the electrode unit 300. Since the color layer 500 is located on the electrode unit 300, light penetrating through the polymer dispersed liquid crystal layer 400 from the outside is directly reflected by the color layer 500 without passing through the electrode unit 300 and the first substrate 100.

The color layer 500 includes a first sub color layer 510, a second sub color layer 520 and a third sub color layer 530 corresponding to respective spaces S resulting from partitioning by the barrier ribs 600 which will be described below. The first sub color layer 510 represents red, the second sub color layer 520 represents green, and the third sub color layer 530 represents blue. That is, the color layer 500 includes a plurality of sub color layers, and the neighboring sub color layers represent different colors.

Barrier ribs 600 are located between the first substrate 100 and the second substrate 200. The barrier ribs 600 partition a space formed between the first substrate 100 and the second substrate 200 into a plurality of spaces S, and the respective spaces S resulting from partition by the barrier ribs 600 correspond to pixels, one of which is the smallest unit of an image displayed by the display device 1003.

As described above, in the display device 1003 according to the third exemplary embodiment, the color layer 500 is located on the first electrode 310 so that the first electrode 310 and the first substrate 100 are not necessarily made of a transparent material. Therefore, it is possible to form the first electrode 310 using an opaque conductive material, such as silver(Ag), gold(Au) or the like, having higher electric conductivity than that of a transparent conductive material, such as indium tin oxide (ITO) or indium zinc oxide (IZO), thereby improving the overall electrical efficiency of the display device 1003.

In addition, in the display device 1003 according to the third exemplary embodiment, the color layer 500 is located on the electrode unit 300 so that it is not necessary to form the first substrate 100 using a transparent material, such as glass or the like.

Furthermore, in the display device 1003 according to the third exemplary embodiment, the color layer 500 includes the first sub color layer 510, the second sub color layer 520 and the third sub color layer 530 which represent different colors so that it is possible to display red, green and blue having various color temperatures according to respective pixels by adjusting the strength of the electric field formed in the spaces S corresponding to respective pixels. Thus, the display device according to the third exemplary embodiment can display color images.

Hereinafter, a display device according to a fourth exemplary embodiment will be described below with reference to FIG. 6.

Figure 6:
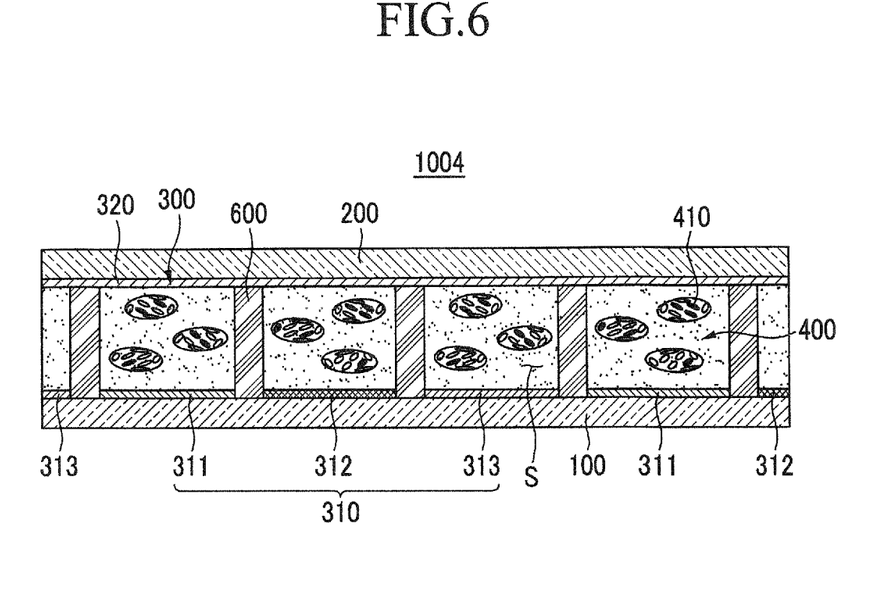
FIG. 6 is a cross-sectional view showing a display device according to a fourth exemplary embodiment of the invention.

FIG. 6 is a cross-sectional view showing a display device according to a fourth exemplary embodiment of the invention.

As shown in FIG. 6, the display device 1004 according to the fourth exemplary embodiment includes a first substrate 100, a second substrate 200, an electrode unit 300, a polymer dispersed liquid crystal layer 400, and barrier ribs 600.

The electrode unit 300 includes a first electrode 310 and a second electrode 320.

The first electrode 310 includes a transparent conductive material, such as indium tin oxide (ITO) or indium zinc oxide (IZO), or an opaque conductive material, such as aluminum (Al), silver (Ag), gold (Au) or the like, and is coated with a color thereon, so that light penetrating through the polymer dispersed liquid crystal layer 400 from the outside is reflected by the first electrode 310.

Specifically, the first electrode 310 includes a first sub electrode 311, a second sub electrode 312 and a third sub electrode 313 corresponding to respective spaces S resulting from partition by the barrier ribs 600. The first sub electrode 311 represents red, the second sub electrode 312 represents green, and the third sub electrode 313 represents blue. That is, the first electrode 310 includes a plurality of sub electrodes, and the neighboring sub electrodes represent different colors.

Barrier ribs 600 are located between the first substrate 100 and the second substrate 200. The barrier ribs 600 partition a space formed between the first substrate 100 and the second substrate 200 into a plurality of spaces S, and the respective spaces S resulting from partition by the barrier ribs 600 correspond to pixels, one of which is the smallest unit of an image displayed by the display device 1004.

As described above, in the display device 1004 according to the fourth exemplary embodiment, the first electrode 310 reflects light penetrating through the polymer dispersed liquid crystal layer 400 so that the first electrode 310 and the first substrate 100 are not necessarily made of a transparent material. Therefore, it is possible to form the first electrode 310 using an opaque conductive material, such as silver (Ag), gold (Au) or the like, having higher electric conductivity than that of a transparent conductive material, such as indium tin oxide (ITO) or indium zinc oxide (IZO), thereby improving the overall electrical efficiency of the display device 1004.

In addition, in the display device 1004 according to the fourth exemplary embodiment, the first electrode 310 which reflects light is located on the first substrate 100 so that it is not necessary to form the first substrate 100 using a transparent material, such as glass or the like.

Furthermore, in the display device 1004 according to the fourth exemplary embodiment, the first electrode 310 includes the first sub electrode 311, the second sub electrode 312 and the third sub electrode 313 which represent different colors so that it is possible to display red, green and blue having various color temperatures according to respective pixels by adjusting the strength of the electric field formed in the spaces S corresponding to respective pixels. Thus, the display device according to the fourth exemplary embodiment can display color images.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a first substrate;
a second substrate opposite the first substrate;
an electrode unit formed on at least one of the first substrate and the second substrate, and configured to form an electric field between the first substrate and the second substrate; and
a polymer dispersed liquid crystal layer located so as to correspond to the electric field formed between the first substrate and the second substrate, and having a reflector configured to reflect light, with the reflector comprising white dye.

2. The display device of claim 1, wherein the polymer dispersed liquid crystal layer includes at least one of a polymer dispersed liquid crystal (PDLC) and a polymer network liquid crystal (PNLC).

3. The display device of claim 2, wherein at least one of the first electrode and the second electrode includes a transparent substrate.

4. The display device of claim 1, further comprising a color layer disposed adjacent the first substrate, and configured to represent at least one color.

5. The display device of claim 4, further comprising at least one barrier rib located between the first substrate and the second substrate, and configured to partition a space between the first substrate and the second substrate into a plurality of spaces.

6. The display device of claim 5, wherein the color layer includes a plurality of sub color layers respectively corresponding to the spaces between the first substrate and the second substrate resulting from partition by the barrier ribs, and wherein neighboring sub color layers of the plurality of sub color layers represent different colors.

7. The display device of claim 5, wherein the polymer dispersed liquid crystal layer includes at least one of a polymer dispersed liquid crystal (PDLC) and a polymer network liquid crystal (PNLC).

8. The display device of claim 4, wherein at least one of the first electrode and the second electrode includes a transparent substrate.

9. The display device of claim 1, wherein the electrode unit comprises:
a first electrode located on the first substrate; and a second electrode located on the second substrate opposite the first electrode.

10. The display device of claim 9, wherein one of the first electrode and the second electrode includes a transparent conductive material.

11. The display device of claim 10, wherein the first electrode represents at least one color.

12. The display device of claim 11, further comprising at least one barrier rib located between the first substrate and the second substrate, and configured to partition a space between the first substrate and the second substrate into a plurality of spaces.

13. The display device of claim 12, wherein the first electrode includes a plurality of sub electrodes respectively corresponding to the spaces between the first substrate and the second substrate resulting from partition by the barrier ribs, and wherein neighboring sub electrodes of the plurality of sub electrodes represent different colors.

14. The display device of claim 9, wherein the polymer dispersed liquid crystal layer includes at least one of a polymer dispersed liquid crystal (PDLC) and a polymer network liquid crystal (PNLC).

15. The display device of claim 9, wherein at least one of the first electrode and the second electrode includes a transparent substrate.

16. The display device of claim 1, wherein the electrode unit comprises:
    a third electrode located on the first substrate; and
    a fourth electrode adjacent the third electrode and located on the first substrate.

17. The display device of claim 16, wherein the polymer dispersed liquid crystal layer includes at least one of a polymer dispersed liquid crystal (PDLC) and a polymer network liquid crystal (PNLC).

18. The display device of claim 16, wherein at least one of the first electrode and the second electrode includes a transparent substrate.

19. The display device of claim 1, wherein the polymer dispersed liquid crystal layer includes at least one of a polymer dispersed liquid crystal (PDLC) and a polymer network liquid crystal (PNLC).

20. The display device of claim 1, wherein at least one of the first electrode and the second electrode includes a transparent substrate.

* * * * *